United States Patent
Matsumura et al.

(10) Patent No.: US 12,391,197 B2
(45) Date of Patent: Aug. 19, 2025

(54) INFORMATION PROCESSING SYSTEM, NON-TRANSITORY STORAGE MEDIUM, AND INFORMATION PROCESSING METHOD

(71) Applicant: TOYOTA JIDOSHA KABUSHIKI KAISHA, Toyota (JP)

(72) Inventors: Taichi Matsumura, Toyota (JP); Katsuma Ishizaki, Nagakute (JP); Mitsuo Sawada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 18/500,402

(22) Filed: Nov. 2, 2023

(65) Prior Publication Data

US 2024/0208439 A1     Jun. 27, 2024

(30) Foreign Application Priority Data

Dec. 27, 2022   (JP) ................. 2022-209624

(51) Int. Cl.
*B60R 16/023*   (2006.01)

(52) U.S. Cl.
CPC ............... *B60R 16/0231* (2013.01)

(58) Field of Classification Search
CPC ............................................. B60R 16/0231
See application file for complete search history.

(56) References Cited

U.S. PATENT DOCUMENTS

| 2016/0253651 A1* | 9/2016 | Park | G06Q 20/34 |
| | | | 705/39 |
| 2021/0179119 A1* | 6/2021 | Lee | B60W 50/0205 |
| 2021/0293390 A1* | 9/2021 | Xiong | H05B 45/10 |

FOREIGN PATENT DOCUMENTS

| JP | 2005-020570 A | 1/2005 |
| JP | 2017-055289 A | 3/2017 |

* cited by examiner

*Primary Examiner* — Behrang Badii
(74) *Attorney, Agent, or Firm* — Oliff PLC

(57) ABSTRACT

An information processing system includes a first ECU and a second ECU. The first ECU is configured to: communicate with the second ECU; acquire an activation request signal from an external device; determine whether the acquired activation request signal has continued for a prescribed period or more; when the first ECU determines that the activation request signal has continued for the prescribed period or more, identify the external device that has output the activation request signal as an abnormal external device; switch the second ECU to a wake-up mode when the first ECU acquires the activation request signal from the external device that is not the abnormal external device while the second ECU is in a sleep mode; and switch the second ECU to the sleep mode when the first ECU acquires the activation request signal from the abnormal external device.

8 Claims, 3 Drawing Sheets

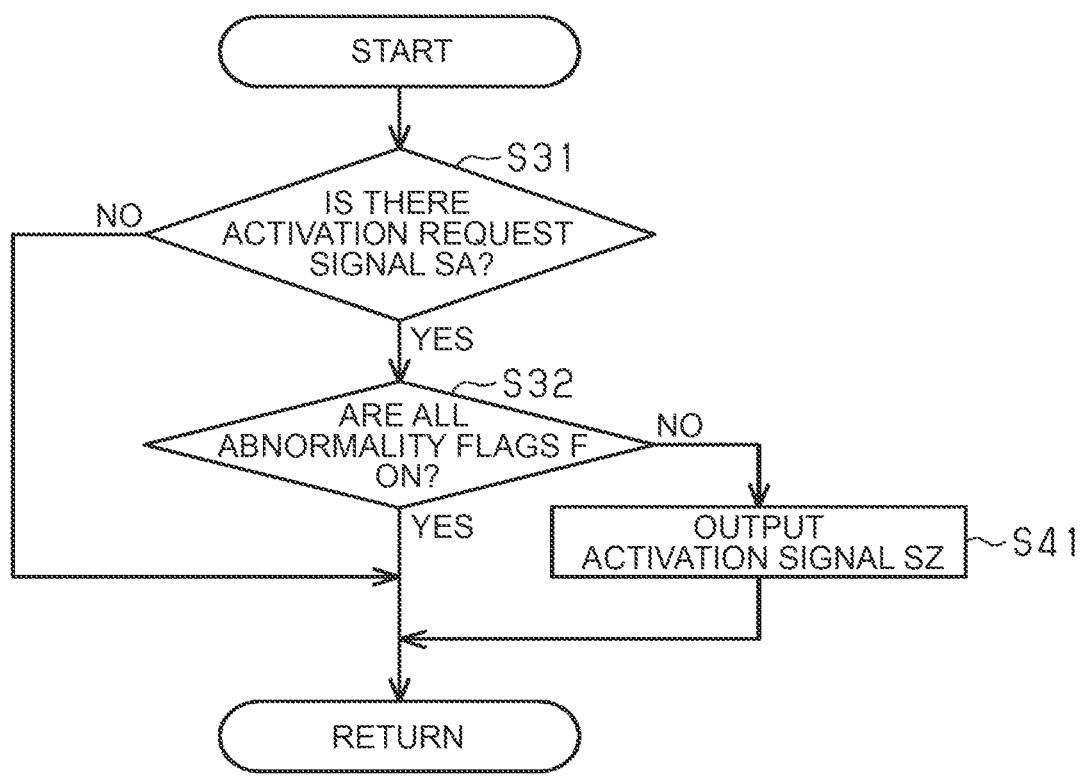

INFORMATION PROCESSING SYSTEM, NON-TRANSITORY STORAGE MEDIUM, AND INFORMATION PROCESSING METHOD

CROSS-REFERENCE TO RELATED APPLICATION

This application claims priority to Japanese Patent Application No. 2022-209624 filed on Dec. 27, 2022, incorporated herein by reference in its entirety.

BACKGROUND

1. Technical Field

The present disclosure relates to information processing systems, non-transitory storage media, and information processing methods.

2. Description of Related Art

An information processing system disclosed in Japanese Unexamined Patent Application Publication No. 2005-020570 (JP 2005-020570 A) includes a first electronic control unit (ECU), a second ECU, and a door state determination switch. The second ECU switches from a wake-up mode to a sleep mode when a predetermined prescribed condition is satisfied. The first ECU is configured to acquire from the door state determination switch an activation request signal requesting to switch the second ECU to the wake-up mode. The first ECU switches the second ECU from the sleep mode to the wake-up mode when the first ECU acquires the activation request signal while the second ECU is in the sleep mode.

SUMMARY

In such an information processing system as that described in JP 2005-020570 A, the door state determination switch may keep outputting the activation request signal due to some abnormality. In this case, the first ECU may unnecessarily switch the second ECU to the wake-up mode.

An information processing system according to a first aspect of the present disclosure includes a first ECU and a second ECU. The first ECU is configured to communicate with the second ECU, acquire an activation request signal from an external device, and determine whether the acquired activation request signal has continued for a prescribed period or more. The first ECU is configured to, when the first ECU determines that the activation request signal has continued for the prescribed period or more, identify the external device that has output the activation request signal as an abnormal external device. The first ECU is configured to switch the second ECU to a wake-up mode when the first ECU acquires the activation request signal from the external device that is not the abnormal external device while the second ECU is in a sleep mode. The first ECU is configured to switch the second ECU to the sleep mode when the first ECU acquires the activation request signal from the abnormal external device.

In the information processing system according to the first aspect of the present disclosure, the first ECU may be configured to switch the second ECU to the sleep mode, when the first ECU acquires the activation request signal from the abnormal external device and does not acquire the activation request signal from the external device that is not the abnormal external device.

In the information processing system according to the first aspect of the present disclosure, the first ECU may be configured to acquire the activation request signal from a plurality of the external devices, and the first ECU may be configured not to identify a predetermined specific external device out of the external devices as the abnormal external device even when the activation request signal from the specific external device has continued for the prescribed period or more.

In the information processing system according to the first aspect of the present disclosure, the first ECU may be configured to reset data regarding whether the external device is the abnormal external device every time a prescribed timing comes.

In the information processing system according to the first aspect of the present disclosure, the prescribed timing may be a timing when a main switch configured to operate a system of a vehicle is turned on or off.

In the information processing system according to the first aspect of the present disclosure, the first ECU may be configured to acquire the activation request signal from a plurality of the external devices. The first ECU may be configured to, even when the first ECU acquires the activation request signal from the abnormal external device, switch the second ECU to the wake-up mode when the first ECU acquires the activation request signal from the external device that is not the abnormal external device while the second ECU is in the sleep mode.

A non-transitory storage medium according to a second aspect of the present disclosure stores instructions that are executable by one or more processors of a first ECU and that cause the one or more processors to perform functions. The functions include: communicating with a second ECU; acquiring an activation request signal from an external device; determining whether the acquired activation request signal has continued for a prescribed period or more; when determination is made that the activation request signal has continued for the prescribed period or more, identifying the external device that has output the activation request signal as an abnormal external device; switching the second ECU to a wake-up mode when the activation request signal is acquired from the external device that is not the abnormal external device while the second ECU is in a sleep mode; and switching the second ECU to the sleep mode when the activation request signal is acquired from the abnormal external device.

An information processing method that is performed by a first ECU according to a third aspect of the present disclosure includes: communicating with a second ECU; acquiring an activation request signal from an external device; determining whether the acquired activation request signal has continued for a prescribed period or more; when determination is made that the activation request signal has continued for the prescribed period or more, identifying the external device that has output the activation request signal as an abnormal external device; switching the second ECU to a wake-up mode when the activation request signal is acquired from the external device that is not the abnormal external device while the second ECU is in a sleep mode; and switching the second ECU to the sleep mode when the activation request signal is acquired from the abnormal external device.

With each of the above configurations, even if a certain external device keeps outputting an activation request signal due to some abnormality, the second ECU will not be switched to the wake-up mode in response to the activation request signal from the external device in a situation where the activation request signal from the external device has continued for the prescribed period or more. That is, the second ECU is less likely to be unnecessarily switched to the wake-up mode even if some abnormality occurs in the external device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a flowchart of activation control.

DETAILED DESCRIPTION OF EMBODIMENTS

Schematic Configuration of Vehicle

Figure 1:
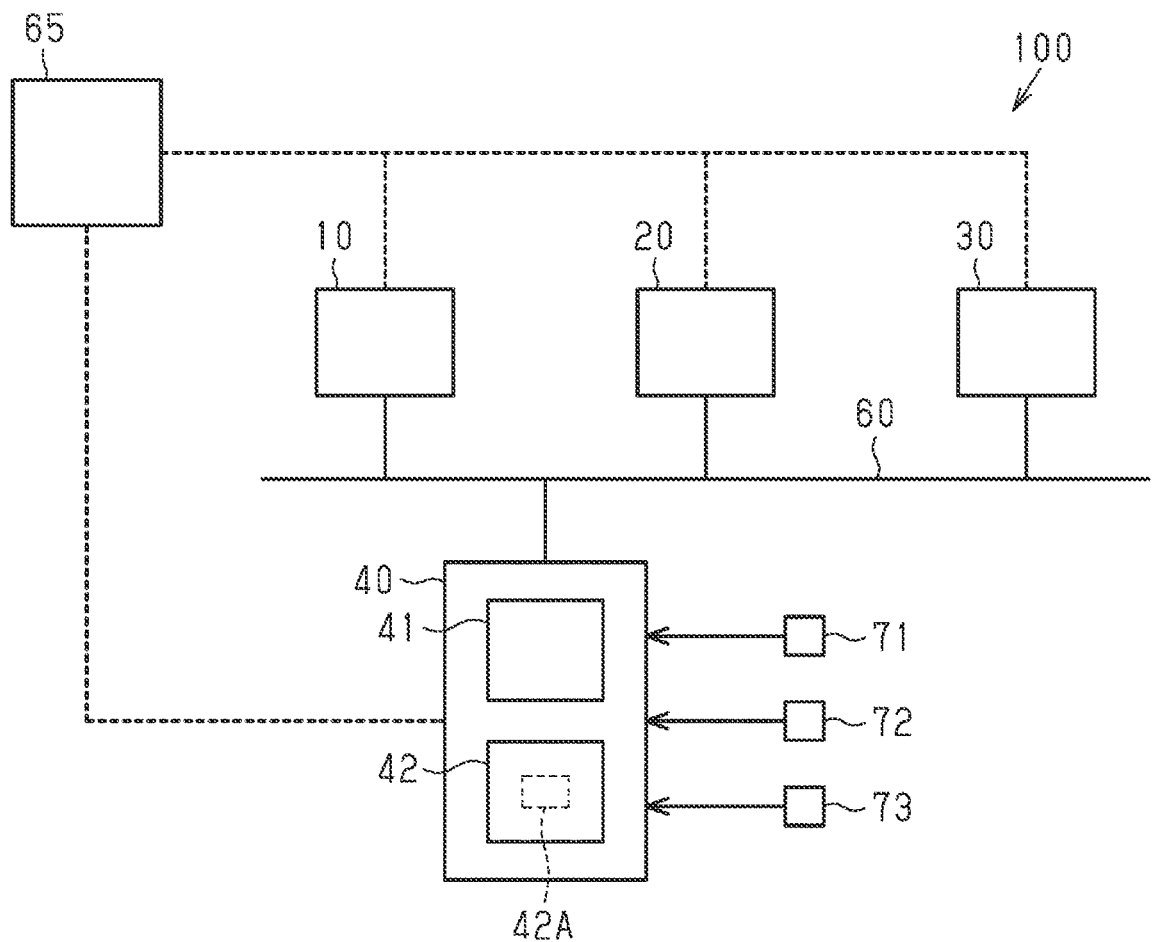
FIG. 1 is a schematic configuration diagram of a vehicle.

An embodiment of the present disclosure will be described below with reference to FIGS. 1 to 3. First, a schematic configuration of a vehicle 100 will be described. FIG. 1 is a schematic configuration diagram of the vehicle 100. As shown in FIG. 1, the vehicle 100 includes an engine ECU 10, a multimedia ECU 20, an advanced driver assistance ECU 30, and a body ECU 40. The term "ECU" is an abbreviation for "electronic control unit." The vehicle 100 further includes a bus 60 and a battery 65. The bus 60 connects the engine ECU 10, the multimedia ECU 20, the advanced driver assistance ECU 30, and the body ECU 40 to each other so that the engine ECU 10, the multimedia ECU 20, the advanced driver assistance ECU 30, and the body ECU 40 can communicate with each other. The battery 65 supplies power to the engine ECU 10, the multimedia ECU 20, the advanced driver assistance ECU 30, and the body ECU 40.

The engine ECU 10 controls an engine, not shown. In the present embodiment, the engine is a driving source for the vehicle 100. The multimedia ECU 20 controls a navigation device, an audio device, etc., not shown. The advanced driver assistance ECU 30 implements various kinds of driver assistance by executing various kinds of application software. The various kinds of application software include application software for the vehicle 100 to follow a preceding vehicle traveling ahead of the vehicle 100 while a constant following distance is maintained.

Each of the engine ECU 10, the multimedia ECU 20, and the advanced driver assistance ECU 30 receives an activation signal SZ from the body ECU 40 in a sleep mode. Each of the engine ECU 10, the multimedia ECU 20, and the advanced driver assistance ECU 30 switches from the sleep mode to a wake-up mode in response to reception of the activation signal SZ. The sleep mode is a mode in which only predetermined minimum functions are enabled out of functions that can be implemented by each ECU. Examples of the minimum functions are functions related to reception of the activation signal SZ and to a process associated with reception of the activation signal SZ. The wake-up mode is a mode in which each ECU can perform its main functions. That is, the engine ECU 10 can control the engine in the wake-up mode. The multimedia ECU 20 can control the navigation device, the audio device, etc. in the wake-up mode. The advanced driver assistance ECU 30 can execute each piece of application software related to driver assistance in the wake-up mode. Therefore, when the engine ECU 10, the multimedia ECU 20, and the advanced driver assistance ECU 30 are in the sleep mode, power consumption of the battery 65 is reduced compared to when they are in the wake-up mode. Each of the engine ECU 10, the multimedia ECU 20, and the advanced driver assistance ECU 30 switches from the wake-up mode to the sleep mode when a predetermined sleep transition condition is satisfied. An example of the sleep transition condition is that the vehicle 100 is in a system OFF mode and a predetermined period or more has elapsed since the most recent activation signal SZ was received. In the present embodiment, each of the engine ECU 10, the multimedia ECU 20, and the advanced driver assistance ECU 30 is an example of the second ECU.

The body ECU 40 controls opening and closing of doors of the vehicle 100 etc. The body ECU 40 includes a central processing unit (CPU) 41 and a storage device 42. The storage device 42 includes a read-only memory (ROM), a random access memory (RAM), and a storage. The storage device 42 stores various programs and various kinds of data in advance. The storage device 42 stores a mode control application 42A as one of the various programs. The mode control application 42A is application software for implementing flag setting control and activation control that will be described later. The CPU 41 implements various processes (functions) by executing the various programs stored in the storage device 42. In the present embodiment, the body ECU 40 is an example of the first ECU. Therefore, the engine ECU 10, the multimedia ECU 20, the advanced driver assistance ECU 30, and the body ECU 40 form an information processing system. The mode control application 42A is an example of an information processing program. A series of methods that is implemented by the body ECU 40 executing the mode control application 42A is an example of the information processing method. The CPU 41 may be a processor. The storage device 42 may be a non-transitory storage medium.

As shown in FIG. 1, the vehicle 100 includes a door sensor 71, a kick sensor 72, and a main switch 73. The door sensor 71 is located near a door handle of the door of the vehicle 100. For example, when a user of the vehicle 100 is touching the door handle, the door sensor 71 outputs an ON signal. For example, when the user of the vehicle 100 is not touching the door handle, the door sensor 71 outputs an OFF signal.

The kick sensor 72 is mounted at a position near an under panel of the vehicle 100 and below the door of the vehicle 100. For example, when a foot of the user of the vehicle 100 is located near the kick sensor 72, the kick sensor 72 outputs an ON signal. For example, when a foot of the user of the vehicle 100 is not located near the kick sensor 72, the kick sensor 72 outputs an OFF signal.

The main switch 73 is located near a driver's seat of the vehicle 100. The main switch 73 is a switch for operating a system of the vehicle 100. The main switch 73 is also called a start switch, an ignition switch, etc. The main switch 73 outputs a switching signal every time the user of the vehicle 100 presses the main switch 73. When the main switch 73 is pressed while the vehicle 100 is in a system ON mode, the vehicle 100 is switched to the system OFF mode. Therefore, the operation of pressing the main switch 73 while the vehicle 100 is in the system ON mode is an operation of turning off the main switch 73. When the main switch 73 is pressed while the vehicle 100 is in the system OFF mode, the vehicle 100 is switched to the system ON mode. Therefore, the operation of pressing the main switch 73 while the vehicle 100 is in the system OFF mode is an operation of turning on the main switch 73.

The door sensor 71, the kick sensor 72, and the main switch 73 can communicate with the body ECU 40 via a wired communication path different from the bus 60. The body ECU 40 can acquire signals from each of the door sensor 71, the kick sensor 72, and the main switch 73. In the present embodiment, each of the ON signal from the door sensor 71 and the ON signal from the kick sensor 72 is an example of the activation request signal SA. The switching signal from the main switch 73 when the vehicle 100 is in the system OFF mode is an example of the activation request signal SA. Therefore, the door sensor 71, the kick sensor 72, and the main switch 73 are an example of the plurality of external devices.

Flag Setting Control

Next, the flag setting control that is performed by the body ECU 40 will be described with reference to FIG. 2. FIG. 2 is a flowchart of the flag setting control. The body ECU 40 performs the flag setting control for the door sensor 71 and the kick sensor 72 out of the door sensor 71, the kick sensor 72, and the main switch 73. That is, in the present embodiment, the main switch 73 is a specific external device determined in advance to be excluded from the flag setting control. The body ECU 40 repeatedly performs the flag setting control at every predetermined control cycle. The body ECU 40 separately performs the flag setting control for the door sensor 71 and the flag setting control for the kick sensor 72 in parallel with each other. In the following description, the door sensor 71 and the kick sensor 72 may be referred to as "external devices" when it is not necessary to distinguish between them.

Figure 2:
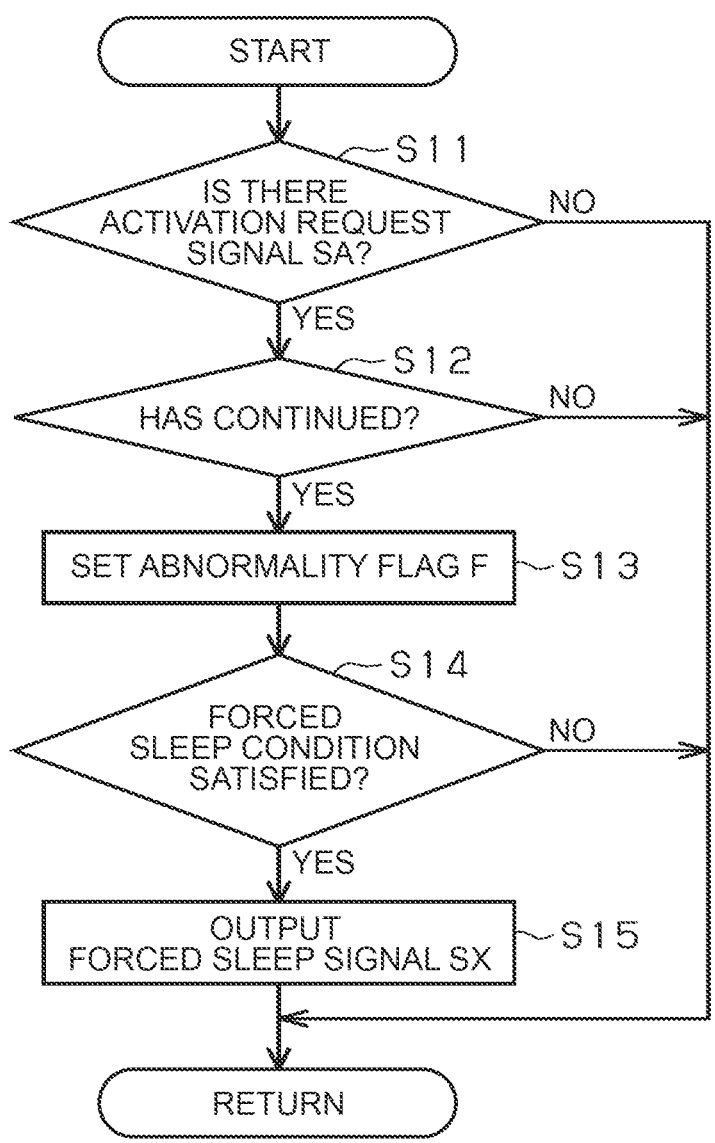
FIG. 2 is a flowchart of flag setting control.

As shown in FIG. 2, after the body ECU 40 starts the flag setting control, it first performs step S11. In step S11, the body ECU 40 determines whether there is an activation request signal SA from any external device for which the flag setting control is to be performed (whether the body ECU 40 has received an activation request signal SA from any external device). When the body ECU 40 determines in step S11 that there is no activation request signal SA from any external device (the body ECU 40 has not received an activation request signal SA from any external device) (S11: NO), the body ECU 40 ends the current flag setting control. The body ECU 40 starts the flag setting control at every control cycle, and the body ECU 40 proceeds the process to step S11 again. On the other hand, when the body ECU 40 determines in step S11 that there is an activation request signal SA from any external device (S11: YES), the body ECU 40 proceeds the process to step S12.

In step S12, the body ECU 40 determines whether the activation request signal SA has continued for a predetermined prescribed period A or more (the body ECU 40 has been continuously receiving the activation request signal SA for the predetermined prescribed period A or more). Specifically, the body ECU 40 determines that the activation request signal SA has continued for the prescribed period A or more when either or both of the following conditions (1) and (2) are satisfied.

Condition (1): The body ECU 40 has been continuously acquiring the activation request signal SA for the period from the prescribed period A before the time when step S12 is performed to the time when step S12 is performed.

Condition (2): The body ECU 40 has acquired the activation request signal SA a predetermined prescribed number of times B or more during the period from the prescribed period A before the time when step S12 is performed to the time when step S12 is performed.

Regarding Condition (2), when a signal from the door sensor 71 sequentially changes in order of an ON signal, an OFF signal, and an ON signal, it means that the activation request signal SA is acquired twice. An example of the prescribed period A is several minutes to several tens of minutes. An example of the prescribed number of times B is several tens of times to several hundreds of times.

When the body ECU 40 determines in step S12 that the activation request signal SA has not continued for the prescribed period A or more (S12: NO), the body ECU 40 ends the current flag setting control. The body ECU 40 then starts the flag setting control again, and the process proceeds to step S11.

On the other hand, when the body ECU 40 determines in step S12 that the activation request signal SA has continued for the prescribed period A or more (S12: YES), the body ECU 40 proceeds the process to step S13.

In step S13, the body ECU 40 sets an abnormality flag F corresponding to the external device for which the flag setting control is to be performed to ON. In the present embodiment, setting the abnormality flag F to ON indicates identifying an external device that has output an activation request signal SA as an abnormal external device when this activation request signal SA has continued for the prescribed period A or more. The abnormality flag F was OFF at the time the vehicle 100 was manufactured. After step S13, the process proceeds to step S14.

In step S14, the body ECU 40 determines whether a predetermined forced sleep condition is satisfied. An example of the forced sleep condition is that the body ECU 40 has acquired an activation request signal SA only from the external device whose abnormality flag F is ON. When the body ECU 40 determines in step S14 that the forced sleep condition is not satisfied (S14: NO), the body ECU 40 ends the current flag setting control. The body ECU 40 then starts the flag setting control again, and the process proceeds to step S11. On the other hand, when the body ECU 40 determines in step S14 that the forced sleep condition is satisfied (S14: YES), the body ECU 40 proceeds the process to step S15.

In step S15, the body ECU 40 outputs a forced sleep signal SX to the engine ECU 10, the multimedia ECU 20, and the advanced driver assistance ECU 30. Each of the engine ECU 10, the multimedia ECU 20, and the advanced driver assistance ECU 30 switches from the wake-up mode to the sleep mode in response to the forced sleep signal SX received from the body ECU 40 while in the wake-up mode. Therefore, in step S15, the body ECU 40 switches the engine ECU 10 etc. from the wake-up mode to the sleep mode when the body ECU 40 acquires the activation request signal SA from the abnormal external device. After step S15, the body ECU 40 ends the current flag setting control. The body ECU 40 then starts the flag setting control again, and the process proceeds to step S11.

As described above, in the present embodiment, the main switch 73 is a specific external device excluded from the flag setting control. Since the main switch 73 is a specific external device, the body ECU 40 will not identify the main switch 73 that is the specific external device as an abnormal external device even when an activation request signal SA from the main switch 73 has continued for the prescribed period A or more.

The body ECU 40 sets all the abnormality flags F to OFF, every time the main switch 73 is turned on. In the present embodiment, the timing the main switch 73 is turned on is an example of the predetermined prescribed timing. Setting all the abnormality flags F to OFF is an example of resetting data regarding whether the external devices are abnormal external devices.

Activation Control

Next, the activation control that is performed by the body ECU 40 will be described with reference to FIG. 3. The body ECU 40 repeatedly performs the activation control at every predetermined control cycle.

As shown in FIG. 3, after the body ECU 40 starts the activation control, it first performs step S31. In step S31, the body ECU 40 determines whether there is an activation request signal SA from any external device (whether the body ECU 40 has received an activation request signal SA from any external device). When the body ECU 40 determines in step S31 that there is no activation request signal SA from any external device (S31: NO), the body ECU 40 ends the current activation control. The body ECU 40 then starts the activation control again, and the process proceeds to step S31. On the other hand, when the body ECU 40 determines in step S31 that there is an activation request signal SA from any external device (S31: YES), the process proceeds to step S32.

In step S32, the body ECU 40 determines whether the abnormality flag F corresponding to every external device that has output the activation request signal SA is ON. When the body ECU 40 determines in step S32 that all the abnormality flags F corresponding to the external devices outputting the activation request signal SA are ON (S32: YES), the body ECU 40 ends the current activation control. The process then returns to step S31. In other words, when the body ECU 40 acquires the activation request signal SA only from the abnormal external device(s), the body ECU 40 does not perform step S41 that will be described later. That is, the body ECU 40 does not output an activation signal SZ.

On the other hand, when the body ECU 40 determines in step S32 that at least one of the abnormality flags F corresponding to the external devices outputting the activation request signal SA is OFF (S32: NO), the process proceeds to step S41. In other words, when the body ECU 40 acquires an activation request signal SA from any external device that is not an abnormal external device, the body ECU 40 proceeds the process to step S41.

In step S41, the body ECU 40 outputs an activation signal SZ to the engine ECU 10, the multimedia ECU 20, and the advanced driver assistance ECU 30. After step S41, the body ECU 40 ends the current activation control. The body ECU 40 then starts the activation control again, and the process proceeds to step S31.

Functions of Embodiment

For example, it is herein assumed that the kick sensor 72 keeps outputting an activation request signal SA due to some abnormality or the surrounding environment. In this case, the body ECU 40 outputs an activation signal SZ to the engine ECU 10, the multimedia ECU 20, and the advanced driver assistance ECU 30 by step S41 of the activation control. The engine ECU 10, the multimedia ECU 20, and the advanced driver assistance ECU 30 therefore switch to the wake-up mode. However, when the prescribed period A has elapsed after the kick sensor 72 started outputting the activation request signal SA, the abnormality flag F corresponding to the kick sensor 72 is set to ON by the flag setting control. Moreover, the body ECU 40 outputs a forced sleep signal SX. As a result, the engine ECU 10, the multimedia ECU 20, and the advanced driver assistance ECU 30 are forced into the sleep mode. In the subsequent activation controls, even when it is determined in step S31 that there is an activation request signal SA from the kick sensor 72, it is determined in step S32 that the abnormality flag F corresponding to the kick sensor 72 is ON. That is, step S41 will not be performed unless there is an activation request signal SA from any other external device. Therefore, the body ECU 40 does not output an activation signal SZ. As a result, the engine ECU 10, the multimedia ECU 20, and the advanced driver assistance ECU 30 do not receive an activation signal SZ. Therefore, each of these ECUs does not switch the wake-up mode.

It is assumed that the door sensor 71 also outputs an activation request signal SA after the prescribed period A has elapsed since the kick sensor 72 started outputting an activation request signal SA. In this case, it is determined in step S32 of the activation control that the abnormality flag F of one of the external devices outputting the activation request signal SA is OFF, and the process proceeds to step S41. In step S41, the body ECU 40 outputs an activation signal SZ to the engine ECU 10, the multimedia ECU 20, and the advanced driver assistance ECU 30. The engine ECU 10, the multimedia ECU 20, and the advanced driver assistance ECU 30 therefore switch from the sleep mode to the wake-up mode in response to the activation signal SZ from the body ECU 40. In other words, even when the body ECU 40 acquires an activation request signal SA from an abnormal external device, the engine ECU 10 etc. are switched to the wake-up mode when the body ECU 40 also acquires an activation request signal SA from an external device that is not an abnormal external device while the engine ECU 10 etc. are in the sleep mode.

Effects of Embodiment (1) In the present embodiment, for example, even when the kick sensor 72 keeps outputting an activation request signal SA, the abnormality flag F corresponding to the kick sensor 72 is set to ON in a situation where the activation request signal SA from the kick sensor 72 has continued for the prescribed period A or more. In this case, even when the kick sensor 72 keeps outputting the activation request signal SA, the body ECU 40 will not output an activation signal SZ unless the body ECU 40 receives an activation request signal SA from any other external device. Therefore, the engine ECU 10, the multimedia ECU 20, and the advanced driver assistance ECU 30 will not be unnecessarily switched from the sleep mode to the wake-up mode in response to the activation request signal SA from the abnormal kick sensor 72. As described above, even if some abnormality occurs in an external device, the engine ECU 10, the multimedia ECU 20, and the advanced driver assistance ECU 30 are less likely to be unnecessarily switched to the wake-up mode due to an activation request signal SA from the abnormal external device. For example, this reduces power consumption of the battery 65 due to the engine ECU 10, the multimedia ECU 20, and the advanced driver assistance ECU 30 being switched to the wake-up mode.

(2) For example, even when the abnormality flag F corresponding to the kick sensor 72 is ON, there is a high necessity to switch the engine ECU 10 etc. to the wake-up mode when an activation request signal SA is output from the normal door sensor 71 that is not an abnormal external device. In the present embodiment, when an activation request signal SA is output from the normal door sensor 71 in addition to an activation request signal SA from the abnormal kick sensor 72, the body ECU 40 outputs an activation signal SZ to the engine ECU 10 etc. Accordingly, even in a situation where the abnormality flag F is ON, that is, even in a situation where an activation request signal SA is output from an abnormal external device, the engine ECU 10 etc. can be switched to the wake-up mode in response to an activation request signal SA from a normal external device.

(3) For example, an external device may keep outputting an activation request signal SA due to the surrounding environment of the external device rather than abnormality of the external device itself. In this case, the external device may be able to output a normal activation request signal SA as time elapses etc.

In this regard, in the present embodiment, the body ECU 40 sets all the abnormality flags F to OFF, that is, resets the data regarding whether the external devices are abnormal external devices, every time the predetermined prescribed timing comes. This reduces the possibility of an external device continuing to be identified as an abnormal external device.

(4) In the present embodiment, the predetermined prescribed timing is the timing when the main switch 73 is turned on. The timing when the main switch 73 is turned on is very likely to be when a trip of the vehicle 100 starts. In the vehicle 100, the environment around the vehicle 100 changes for each trip, for example, with a change in parking location. Accordingly, there is a possibility that an external device identified as an abnormal external device may function properly. That is, the timing when the main switch 73 is turned on is suitable as the timing to reset the data regarding whether the external devices are abnormal external devices.

(5) If the abnormality flag F corresponding to the main switch 73 is set to ON, the engine ECU 10 etc. may not be switched from the sleep mode to the wake-up mode in response to an activation request signal SA from the main switch 73. In this case, for example, even when the user of vehicle 100 operates the main switch 73, the system of the vehicle 100 may not be activated appropriately.

In this regard, in the present embodiment, the main switch 73 is a predetermined specific external device. Since the main switch 73 is a specific external device, the body ECU 40 will not identify the main switch 73 that is the specific external device as an abnormal external device even when an activation request signal SA from the main switch 73 has continued for the prescribed period A or more. That is, for example, even when the main switch 73 keeps outputting an activation request signal SA, the abnormality flag F corresponding to the main switch 73 will not be set to ON. Each of the engine ECU 10, the multimedia ECU 20, and the advanced driver assistance ECU 30 can thus be switched from the sleep mode to the wake-up mode in response to the activation request signal SA from the main switch 73.

Modifications

The above embodiment can be modified as follows. The above embodiment and the following modifications may be combined as long as no technical contradiction arises.

In the above embodiment, the flag setting control may be changed. For example, in step S12, only Condition (1) may be used as a condition to determine that an activation request signal SA has continued for the prescribed period A or more. Alternatively, for example, in step S12, only Condition (2) may be used as the condition to determine that an activation request signal SA has continued for the prescribed period A or more.

For example, steps S14 and S15 may be omitted. Specifically, even when a forced sleep signal SX is not output in step S15, the sleep transition condition may be satisfied when an activation signal SZ is no longer output due to the abnormality flag F being set to ON in step S13. As a result, the engine ECU 10 etc. can be switched from the wake-up mode to the sleep mode even when steps S14 and S15 are omitted.

In the above embodiment, the configuration for resetting the data regarding whether the external devices are abnormal external devices may be changed. For example, the body ECU 40 may set all the abnormality flags F to OFF every time the main switch 73 is turned off instead of every time the main switch 73 is turned on.

Alternatively, for example, the body ECU 40 may set all the abnormality flags F to OFF in every time of at least one of the following cases: (i) the main switch 73 is turned on, and (ii) the main switch 73 is turned off.

For example, the body ECU 40 may set the abnormality flag F to OFF every time a predetermined period has elapsed since the abnormality flag F was set. That is, as described above, the prescribed timing to reset the data regarding whether the external devices are abnormal external devices can be changed.

For example, the body ECU 40 may not set the abnormality flag F to OFF. As a specific example, the abnormality flag F corresponding to an external device may be set to ON due to a failure of the external device. In this case, instead of the body ECU 40 setting the abnormality flag F to OFF, an operator who performs maintenance of the vehicle 100, for example, preferably sets the abnormality flag F to OFF after replacing the broken external device with a new external device during the maintenance.

In the above embodiment, the activation control may be changed. For example, in the activation control, the body ECU 40 may switch the engine ECU 10 etc. from the wake-up mode to the sleep mode when the body ECU 40 acquires an activation request signal SA from any abnormal external device. As a specific example, when the body ECU 40 determined YES in step S32, the body ECU 40 may then perform the process of outputting a forced sleep signal SX to the engine ECU 10, the multimedia ECU 20, and the advanced driver assistance ECU 30. In this case, steps S14 and S15 can be omitted from the flag setting control.

In the above embodiment, the configuration related to the external devices may be changed. For example, the external devices are not limited to the door sensor 71, the kick sensor 72, and the main switch 73. As a specific example, sensors such as a proximity sensor configured to detect an object etc. outside the vehicle 100 may be used as the external devices. Alternatively, as a specific example, the external devices may be ECUs. That is, any devices, such as sensors, switches, and ECUs, that can output an activation request signal SA to the first ECU may be used as the external devices.

For example, the number of external devices may be changed. As a specific example, the number of external devices may be two or less, or may be four or more. That is, the number of external devices may be changed as long as it is one or more.

For example, the activation request signal SA from the external device may be changed. As a specific example, depending on the configuration of the door sensor 71, the door sensor 71 outputs an OFF signal when, for example, the user of the vehicle 100 is touching a door knob. In this case, the activation request signal SA may be the OFF signal from the door sensor 71 etc. Similarly, the activation request signal SA from the kick sensor 72 etc. may be changed. In the above specific example, for example, the OFF signal from the door sensor 71 may be used as an activation request signal SA, whereas the ON signal from the kick sensor 72 may be used as an activation request signal SA.

For example, the specific external device may be changed. As a specific example, instead of or in addition to the main switch 73, the door sensor 71 may be a specific external device. That is, any external device can be a specific external device.

For example, the number of specific external devices may be changed. As a specific example, the number of specific external devices may be two or more. As another specific example, the number of specific external devices may be zero. That is, a specific external device need not necessarily be set.

In the above embodiment, the configuration related to the first ECU may be changed. For example, the first ECU is not limited to the body ECU 40. As a specific example, one of the engine ECU 10, the multimedia ECU 20, and the advanced driver assistance ECU 30 may be used as the first ECU instead of the body ECU 40 as long as that ECU can acquire an activation request signal SA from an external device.

In the above embodiment, the configuration related to the second ECUs may be changed. For example, the second ECUs are not limited to the engine ECU 10, the multimedia ECU 20, and the advanced driver assistance ECU 30. As a specific example, a transmission ECU, a brake ECU, etc. in the vehicle 100 may be used as the second ECUs as long as they can communicate with the first ECU via the bus 60.

For example, the number of second ECUs may be changed. As a specific example, the number of second ECUs may be two or less, or may be four or more. That is, the number of second ECUs may be changed as long as it is one or more.

In the above embodiment, the connection configuration between the first ECU and the second ECUs may be changed. For example, the first ECU may be connected to the second ECUs via connection lines that directly connect devices one-to-one, namely so-called direct lines, instead of via the bus 60. That is, the connection configuration between the first ECU and the second ECUs may be changed as long as the first ECU can communicate with the second ECUs.

Other Technical Ideas

Technical ideas that can be grasped from the above embodiment and modifications will be described.

Note 1

An information processing system includes a first ECU and a second ECU. The first ECU is configured to communicate with a second ECU, acquire an activation request signal from an external device, determine whether the acquired activation request signal has continued for a predetermined prescribed period or more, when the first ECU determines that the activation request signal has continued for the prescribed period or more, identify the external device that has output the activation request signal as an abnormal external device, switch the second ECU to a wake-up mode when the first ECU acquires the activation request signal from the external device that is not the abnormal external device while the second ECU is in a sleep mode, and switch the second ECU to the sleep mode when the first ECU acquires the activation request signal from the abnormal external device.

Note 2

In the information processing system according to note 1, the first ECU is configured to switch the second ECU to the sleep mode when the first ECU acquires the activation request signal from the abnormal external device and does not acquire the activation request signal from the external device that is not the abnormal external device.

Note 3

In the information processing system according to note 1, the first ECU is configured to acquire the activation request signal from a plurality of the external devices, and for a predetermined specific external device out of the external devices, not identify the specific external device as the abnormal external device even when the activation request signal from the specific external device has continued for the prescribed period or more.

Note 4

In the information processing system according to note 1, the first ECU is configured to reset data regarding whether the external device is the abnormal external device every time a predetermined prescribed timing comes.

Note 5

In the information processing system according to note 4, the prescribed timing is a timing when a main switch configured to operate a system of a vehicle is turned on or off.

Note 6

In the information processing system according to note 1, the first ECU is configured to acquire the activation request signal from a plurality of the external devices, and even when the first ECU acquires the activation request signal from the abnormal external device, switch the second ECU to the wake-up mode when the first ECU acquires the activation request signal from the external device that is not the abnormal external device while the second ECU is in the sleep mode.

Note 7

A non-transitory storage medium stores instructions that are executable by one or more processors of a first ECU and that cause the one or more processors to perform functions including: communicating with a second ECU; acquiring an activation request signal from an external device; determining whether the acquired activation request signal has continued for a predetermined prescribed period or more; when determination is made that the activation request signal has continued for the prescribed period or more, identifying the external device that has output the activation request signal as an abnormal external device; switching the second ECU to a wake-up mode when the activation request signal is acquired from the external device that is not the abnormal external device while the second ECU is in a sleep mode; and switching the second ECU to the sleep mode when the activation request signal is acquired from the abnormal external device.

Note 8

An information processing method that is performed by a first ECU includes: communicating with a second ECU; acquiring an activation request signal from an external device; determining whether the acquired activation request signal has continued for a predetermined prescribed period or more; when determination is made that the activation request signal has continued for the prescribed period or more, identifying the external device that has output the activation request signal as an abnormal external device; switching the second ECU to a wake-up mode when the activation request signal is acquired from the external device that is not the abnormal external device while the second ECU is in a sleep mode; and switching the second ECU to the sleep mode when the activation request signal is acquired from the abnormal external device.

What is claimed is:

1. An information communication system comprising:
a first electronic control unit configured to
communicate with a second electronic control unit,
acquire an activation request signal from an external device,
determine whether the acquired activation request signal has continued for a prescribed period or more,
when the first electronic control unit determines that the activation request signal has continued for the prescribed period or more, identify the external device that has output the activation request signal as an abnormal external device,
switch the second electronic control unit to a wake-up mode when the first electronic control unit acquires the activation request signal from the external device that is not the abnormal external device while the second electronic control unit is in a sleep mode, and
switch the second electronic control unit to the sleep mode when the first electronic control unit acquires the activation request signal from the abnormal external device; and
the second electronic control unit.

2. The information processing system according to claim 1, wherein the first electronic control unit is configured to switch the second electronic control unit to the sleep mode, when the first electronic control unit acquires the activation request signal from the abnormal external device and does not acquire the activation request signal from the external device that is not the abnormal external device.

3. The information processing system according to claim 1, wherein the first electronic control unit is configured to acquire the activation request signal from a plurality of the external devices, and
the first electronic control unit is configured not to identify a predetermined specific external device out of the external devices as the abnormal external device even when the activation request signal from the specific external device has continued for the prescribed period or more.

4. The information processing system according to claim 1, wherein the first electronic control unit is configured to reset data regarding whether the external device is the abnormal external device every time a prescribed timing comes.

5. The information processing system according to claim 4, wherein the prescribed timing is a timing when a main switch configured to operate a system of a vehicle is turned on or off.

6. The information processing system according to claim 1, wherein the first electronic control unit is configured to acquire the activation request signal from a plurality of the external devices, and even when the first electronic control unit acquires the activation request signal from the abnormal external device, switch the second electronic control unit to the wake-up mode when the first electronic control unit acquires the activation request signal from the external device that is not the abnormal external device while the second electronic control unit is in the sleep mode.

7. A non-transitory storage medium storing instructions that are executable by one or more processors of a first electronic control unit and that cause the one or more processors to perform functions comprising:
communicating with a second electronic control unit;
acquiring an activation request signal from an external device;
determining whether the acquired activation request signal has continued for a prescribed period or more;
when determination is made that the activation request signal has continued for the prescribed period or more, identifying the external device that has output the activation request signal as an abnormal external device;
switching the second electronic control unit to a wake-up mode when the activation request signal is acquired from the external device that is not the abnormal external device while the second electronic control unit is in a sleep mode; and
switching the second electronic control unit to the sleep mode when the activation request signal is acquired from the abnormal external device.

8. An information processing method that is performed by a first electronic control unit, the information processing method comprising:
communicating with a second electronic control unit;
acquiring an activation request signal from an external device;
determining whether the acquired activation request signal has continued for a prescribed period or more;
when determination is made that the activation request signal has continued for the prescribed period or more, identifying the external device that has output the activation request signal as an abnormal external device;
switching the second electronic control unit to a wake-up mode when the activation request signal is acquired from the external device that is not the abnormal external device while the second electronic control unit is in a sleep mode; and
switching the second electronic control unit to the sleep mode when the activation request signal is acquired from the abnormal external device.

* * * * *